United States Patent [19]

McCready

[11] Patent Number: 4,594,377

[45] Date of Patent: Jun. 10, 1986

[54] MODIFIED THERMOPLASTIC COPOLYETHERIMIDE ESTER ELASTOMERS

[75] Inventor: Russell J. McCready, Mt. Vernon, Ind.

[73] Assignee: General Electric Company, Pittsfield, Mass.

[21] Appl. No.: 740,661

[22] Filed: Jun. 3, 1985

Related U.S. Application Data

[62] Division of Ser. No. 665,315, Oct. 26, 1984, Pat. No. 4,544,734.

[51] Int. Cl.$^4$ .......................... C08K 5/34; C08L 67/02
[52] U.S. Cl. .................................... 524/101; 525/437; 525/444.5
[58] Field of Search ............................ 525/437, 444.5; 524/101

[56] References Cited

U.S. PATENT DOCUMENTS

| | | | |
|---|---|---|---|
| 3,236,895 | 2/1966 | Lee | 260/584 |
| 3,274,159 | 9/1966 | Kluber | 260/75 |
| 3,355,427 | 11/1967 | Loncrini | 260/47 |
| 3,461,136 | 8/1969 | Pruckmayr | 260/326 |
| 3,555,113 | 1/1971 | Sattler | 260/858 |
| 3,654,370 | 4/1972 | Yeakey | 260/584 |
| 3,695,929 | 10/1972 | Sattler | 428/383 |
| 3,966,675 | 6/1976 | Schurdak et al. | 524/101 |
| 3,975,330 | 8/1976 | Suzuki | 528/289 |
| 4,127,553 | 11/1978 | Osada et al. | 260/33.2 |
| 4,228,247 | 10/1980 | Moore et al. | 524/101 X |
| 4,230,838 | 10/1980 | Foy et al. | 528/408 |
| 4,307,226 | 12/1981 | Bolon et al. | 528/288 |
| 4,331,786 | 5/1982 | Foy et al. | 528/408 |
| 4,361,680 | 11/1982 | Borg et al. | 525/420 |
| 4,362,861 | 12/1982 | Shen | 528/289 |
| 4,371,692 | 2/1983 | Wolfe, Jr. | 528/289 |
| 4,371,693 | 2/1983 | Wolfe, Jr. | 528/292 |
| 4,390,686 | 6/1983 | Janssen et al. | 528/289 |
| 4,405,749 | 9/1983 | Nelsen | 524/101 X |

FOREIGN PATENT DOCUMENTS

| | | |
|---|---|---|
| 1466708 | 1/1966 | France . |
| 1551605 | 1/1968 | France . |
| 2198975 | 5/1974 | France . |

OTHER PUBLICATIONS

Honore, P. et al., "Synthesis and Study of Various Reactive Oligomers and of Poly(ester–imide–ether)s" European Polymer Journal V16, pp. 909–916 10/12/79.
Texaco Chemical Company "JEFFAMINE ® polyoxypropyleneamines" 1978.
"Polyimides" Encyclopedia of Chemical Technology 1971 Supp. vol. 1 pp. 740–773.

Primary Examiner—Lucille M. Phynes
Attorney, Agent, or Firm—Edward K. Welch, II; William F. Mufatti; John W. Harbour

[57] ABSTRACT

Novel modified polyetherimide esters are prepared from diols, dicarboxylic acids and a combination of polyoxyalkylene diimide diacids and dimer acid. These compositions have many excellent properties which make them particularly useful for extrusion and molding applications.

32 Claims, No Drawings

MODIFIED THERMOPLASTIC COPOLYETHERIMIDE ESTER ELASTOMERS

This is a division of application Ser. No. 665,315 filed Oct. 26, 1984, now U.S. Pat. No. 4,544,734, issued Oct. 1, 1985.

The present invention relates to novel, modified thermoplastic copolyetherimide ester elastomers having a high melting point with an improved crystallization rate and increased flexibility as well as improved solvent resistance than unmodified compositions.

Polyetherester imides are well known having been described in numerous publications and patents including for example, Honore et al., "Synthesis and Study of Various Reactive Oligmers and of Poly(ester-imide-ether)s," *European Polymer Journal* Vol. 16, pp. 909–916, Oct. 12, 1979; and in Kluiber et al., U.S. Pat. No. 3,274,159 and Wolfe Jr., U.S. Pat. Nos. 4,371,692 and 4,317,693, respectively. Additionally, applicant's copending, cofiled patent application entitled "Thermoplastic Polyetherimide ester Elastomers" described a novel class of polyetherimide ester having a broad spectrum of superior physical properties including high melting point, excellent flexibility and/or excellent strain/stress characteristics.

While the foregoing polyetherimide ester elastomers have excellent physical properties, they are more susceptible to thermal and oxidative degradation as well as attack by solvents as a consequence of the presence of high amounts of various high molecular weight polyethers in the copolymer. However, the presence of the high molecular weight polyether is vital in order to manifest the physical properties, particularly the low flexural modulus, of such elastomeric compositions.

It is an object of the present invention to provide copolyetherimide esters which have improved thermal and oxidative stability without a loss in other physical properties.

It is also an object of the present invention to provide copolyetherimide esters having improved solvent resistance without sacrificing the superior flexibility of the polyetherimide ester.

Finally, it is an object of the present invention to provide copolyetherimide esters having a high melting point and improved crystallization rates combined with excellent flexibility.

It has now been discovered that modified copolyetherimide esters having improved thermal and oxidative stability, solvent resistance and crystallization and flexibility characteristics can be prepared by conventional processes from (a) one or more diols, (b) one or more dicarboxylic acids and (c) a combination of (i) one or more polyoxyalkylene diimide diacids and (ii) one or more dimer acids, wherein the dimer acid is present in an amount of from about 5 to about 40 weight percent based on the combined weight of (i) and (ii). Preferred compositions encompassed by the present invention may be prepared from (a) one or more $C_2$-$C_{15}$ aliphatic and/or cycloaliphatic diols, (b) one or more $C_4$-$C_{16}$ aliphatic, cycloaliphatic and/or aromatic dicarboxylic acids or ester derivatives thereof and (c) a combination of (i) a polyoxyalkylene diimide diacid and (ii) a dimer acid wherein the dimer acid is present in an amount of from about 15 to about 30 weight percent based on the combined weight of (i) and (ii). The specific amounts of (i) polyoxyalkylene diimide diacid and (ii) dimer acid employed in the practice of the present invention is generally dependent upon the desired properties of the resultant polyetherimide ester. In general, the weight ratio of (c) the combination of (i) polyoxyalkylene diimide diacid and (ii) dimer acid to dicarboxylic acid (b) is from about 0.25 to 2.0, preferably from about 0.4 to about 1.4. Finally, the compositions may contain and preferably do contain additional stabilizers for even greater stabilization and low temperature impact strength.

Suitable diols (a) for use in preparing the compositions of the present invention include saturated and unsaturated aliphatic and cycloaliphatic dihydroxy compounds as well as aromatic dihydroxy compounds. These diols are preferably of a low molecular weight, i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 15 carbon atoms. Exemplary of these diols there may be given ethyleneglycol, propanediol, butanediol, pentanediol, 2-methyl propanediol, 2,2-dimethyl propanediol, hexanediol, decanediol, 1,2-, 1,3- and 1,4-dihydroxy cyclohexane; 1,2-, 1,3- and 1,4-cyclohexane dimethanol, butene diol; hexene diol, etc. Especially preferred are 1,4-butanediol and mixtures thereof with hexanediol or butenediol, most preferably 1,4-butanediol.

Aromatic diols suitable for use in the practice of the present invention are generally those having from 6 to about 15 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and bis(p-hydroxy phenyl), 2,2-propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Dicarboxylic acids (b) which are suitable for use in the practice of the present invention are aliphatic, cycloaliphatic, and/or aromatic dicarboxylic acids. These acids are preferably of a low molecular weight, i.e., having a molecular weight of less than about 300. The term "dicarboxylic acid" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight perference, mentioned above, pertains to the acid and not to its equivalent ester to ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic discarboxylic acids, as the term is used herein, are discarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO₂—.

Representative aliphatic and cycloaliphatic acids which can be used for this invention are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane carboxylic acid, and 1,1-cyclobutane dicarboxylic acid. Preferred aliphatic acids are cyclohexane dicarboxylic acids, sebacic acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene-1,2-bis-(p-oxybenzoic acid), 1,5-naphthalene dicarboxylic acid, 3,4-furan dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(B-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The third component to be used in the practice of the present invention is a combination (c) of (i) polyoxyalkylene diimide diacid and (ii) dimer acid wherein the amount of dimer acid present is from about 5 to about 40 weight percent, preferably from about 15 to about 30 weight percent, based on the combined weight of (i) and (ii).

Polyoxyalkylene diimide diacids (i) suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxyalkylene diamine. These polyoxyalkylene diimide diacids and processes for their preparation are more fully disclosed in applicant's copending, U.S. patent application Ser. No. 665,192, filed Oct. 26, 1984 entitled "High Molecular Weight Diimide Diacids and Diimide Diesters of Tricarboxylic Anhydrides", incorporated herein by reference.

In general, the polyoxyalkylene diimide diacids useful herein may be characterized by the following formula:

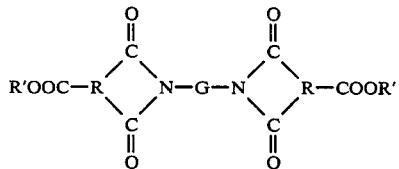

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) amino groups of a long chain alkylene ether diamine having an average molecular weight of from about 600 to about 12,000, preferably from about 900 to about 4000, and a carbon-to-oxygen ratio of from about 1.8 to about 4.3.

Representative long chain ether glycols from which the polyoxyalkylene diamine is prepared by amination include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether)glycols are poly(propylene ether) glycol and poly(ethylene ether)glycols end capped with poly(propylene ether)glycol and/or propylene oxide.

In general, the polyoxyalkylene diamines useful within the scope of the present invention will have an average molecular of from about 600 to 12,000, preferably from about 900 to about 4000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 1,3,4 cyclopentane tricarboxylic anhydride; 2,2',3 diphenyl tricarboxylic anhydride; diphenyl sulfone-3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

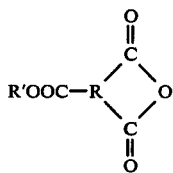

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzyl; most preferably hydrogen.

Briefly, these polyoxyalklene diimide diacids may be prepared by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

Dimer acids (ii) useful in the preparation of the copolyetherimide esters of the present invention are themselves prepared by the dimerization of unsaturated fatty acids of 18 carbons. Exemplary of fatty acids from which they are prepared there may be given oleic acid, linoleic acid and linolenic acid. The preparation and structure of dimer acid is described in *Journal of the American Oil Chemists Society*, 39, 534–545 (1962), *Journal of the American Chemical Society* 66, 84 (1944) and U.S. Pat. No. 2,347,562, all incorporated herein by reference. Suitable dimer acid may be employed in its unhydrogenated or hydrogenated form and include the sacid functioning derivatives thereof.

Several grades of dimer acid are available commercially which vary in monomer and trimer content. Inclusive of suitable commercial dimer acids there may be given those available from Emery Industries under the tradenames EMPOL 1010 (a hydrogenated dimer acid) and EMPOL 1014. EMPOL 1010 is reported as typically containing 97% dimer acid, 3% trimer acid and essentially no monobasic acid and extremely low unsaturation, whereas EMPOL 1014 is typified as containing 95%, 4% and 1% of dimer, trimer and monobasic acids respectively. Also available are the dimer acids sold under the tradename HYSTRENE from the Humko Products Division of Witco Chemical Corporation, especially HYSTRENE 3695 which typically contain 95% dimer acid and a weight ratio of dimer to trimer of 36:1. Preferred grades are substantially free of such monomer and trimer fractions, most preferably less than 5% by weight, and are fully saturated, or substantially so.

Where desirable, the dimer acid member may be substantially freed of monomer and trimer fractions by molecular distillation or other suitable means. In general, the dimer acid exists in the copolyetherimide ester as a soft or rubbery segment and accordingly dimer acids of relatively high molecular weight (preferably greater than about 500) are preferred so that the copolyetherimide esters are resilient, but do not deform until relatively high temperatures are reached.

Applicant has now found that novel copolyetherimide esters may be prepared having high melting temperatures, faster crystallization rates and greater flexibility than unmodified copolyetherimide esters by incorporating therein dimer acid. Specifically, applicants have found that copolyetherimide esters having comparable levels of polyoxyalkylene diimide diacid incorporated therein have less flexibility, resilience and impact properties, including, for example, low temperature impact. Alternatively, unmodified composition having essentially the same flexibility properties, resilience and so forth suffer from greater susceptability to oxidative and thermal degradation as well as manifest poorer solvent resistance, as a consequence of the higher levels of polyether component in the polymer. Thus by the practice of applicant's inventions one is able to achieve compositions of greater flexibility, crystallization rate solvent resistance and thermal and oxidative stability.

In general, the benefits of the present invention can be achieved by incorporating into the copolyetherimide ester from about 5 to about 40 weight percent, preferably from about 15 to about 30 weight percent, based on the combined weight of dimer acid and polyoxyalkylene diimide diacid of dimer acid.

Although the weight ratio of the above ingredients is not critical, it is preferred that the diol be present in at least a molar equivalent amount, preferably a molar excess, most preferably at least 150 mole %, based on the moles of dicarboxylic acid (b) and the combination (c) of (i) polyoxyalkylene diimide diacid and (ii) dimer acid, combined. Such molar excess of diol will allow for optimal yields, based on the amount of acids, while accounting for the loss of diol during esterification/condensation.

Further, while the amount by which the combination(s) of (i) polyoxyalkylene diimide diacid and (ii) dimer acid incorporated into the polymer is not critical to make the novel copolyetherimide esters of the present invention, it is preferred that the combination (c) be present in weight ratio to dicarboxylic acid (b) of from about 0.25 to about 2, preferably from about 0.4 to about 1.4. The actual weight ratio employed will be dependent upon the amount of dimer acid used, the specific polyoxyalkylene diimide diacid used and more importantly, the desired physical and chemical properties of the resultant polyetherimide ester. In general, the lower the ratio of the combination (c) of (i) polyoxyalkene diimide diacid (ii) and dimer acid to dicarboxylic acid the better the strength, crystallization and heat distortion properties of the polymer. Alternatively, the higher the ratio, the better the flexibility, tensile set and low temperature impact characteristics.

In its preferred embodiments, the compositions of the present invention will comprise the reaction product of dimethylterephthalate, optionally with up to 40 mole % of another dicarboxylic acid; 1,4-butanediol, optionally with up to 40 mole % of another saturated or unsaturated aliphatic and/or cycloaliphatic diol; and a combination of (i) a polyoxyalkylene diimide diacid prepared from a polyoxyalkylene diamine of molecular weight of from about 600 to about 12,000, preferably from about 900 to about 4000 and (ii) dimer acid in an amount of from about 10 to about 40% by weight, most preferably from about 15 to about 30% by weight based on the combined weight of (i) and (ii), and optionally trimellitic anhydride. In its most preferred embodiments, the diol will be 100 mole % 1,4-butanediol and the dicarboxylic acid 100 mole % dimethylterephthalate.

The novel polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these copositions may be prepared by such processes and other known processes to effect random copolymers, block compolymers or hybrids thereof wherein both random and block units are present.

It is customary and preferred to utilize a catalyst in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metal insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, manganese acetate or antimony trioxide, and/or with an catalyst quencher as described above.

Although the novel polyetherimide ester of the present invention possess many desirable properties, including improved stability as compared to unmodified polymers, it may be preferred to further enhance stabilization of these compositions to heat, oxidation, radiation by UV light and the like. This can be accomplished by incorporating stabilizer materials into the compositions either during production or while in a hot melt stage following polymerization. The particular stabilizers useful herein are any of those known in the art which are suitable for polyetherimide esters.

Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione; 4,4'-bis(2,6-ditertiary-butylphenol); 1,3,5-trimethyl-2,4,6-tris(3,5-ditertiary-butyl-4-hydroxybenzyl)benzene and 4,4'-butylidene-bis(6-tertiarybutyl-m-cresol. Various inorganic metal salts or hydroxides can be used as well as organic complexes such as nickel dibutyl dithiocarbonate, manganous salicylate and copper 3-phenyl-salicyate. Typical amine stabilizers include N,N'-bis(betanaphthyl)-p-phenylene diamine; N,N'-bis(1-methylheptyl)-p-phenylene diamine and either phenyl-betanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Optionally, it may be desirable to add a minor amount, up to about 20 mole %, preferably up to about 10 mole %, based on the moles of the polyoxyalkalene diimide diacid, of a tricarboxylic component to the reaction mixture. While higher amounts of the tricarboxylic component may be used, this has the disadvantage of reducing some of the beneficial properties of the present polymers. Suitable tricarboxylic components are the same as identified above for the preparation of the polyoxyalkylene diimide diacid. While it is preferred that the additional tricarboxylic component be the same as used in the preparation of the polyoxyalkylene diimide diacid, it is not necessary. The addition of the tricarboxylic acid component will have the added benefit of picking up and reacting with any residual, unreacted amine groups and, consequently, aiding in the viscosity build of the polymer itself.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof.

Physical properties were determined according to the proper ASTM methods as follows:
Flexural Modulus: ASTM D 790
Tensile Elongation: ASTM D 638
Shore D Hardness: ASTM D 2240

In general, all compositions were prepared by placing all reactants in the reaction vessel and heating to 180° C. After the theoretical amount of methanol was removed, the pot temperature was increased to about 250° C. and a vacuum applied (<1 mm Hg) until the desired viscosity polymer was obtained. All reactions, unless otherwise specified were catalyzed with tetraoctyl titanate catalyst.

Diimide Diacid A

A polyoxyalkylene diimide diacid was prepared by the imidization of trimellitic anhydride with Texaco Chemical Company's Jeffamine ® D2000, a polypropylene ether diamine, average molecular weight 2000.

Diimide Diacid B

A second polyoxyalkylene diimide diacid was prepared by the imidization of trimellitic anhydride with Texaco Chemical Company's Jeffamine ED-900, a predominately polyethylene oxide backbone, copoly(ethylene oxide-propylene oxide) diamine, average molecular weight 900.

EXAMPLES E1–E4, COMPARATIVE EXAMPLES CE1–CE6

A series of examples were prepared typifiying the modified copolyetherimide esters of the present invention and unmodified copolyetherimide esters. In addition to demonstrating the benefits attributed to these compositions, these examples demonstrate the broad application of the present teaching giving examples with different amounts of dimer, varying weight ratio of (i) polyoxyalkylene diimide diacids and (ii) dimer to dicarboxylic acid (b) and various polyoxyalkylene diimide diacids. The specific compositions of each example and comparative example as well as the physical properties thereof are set forth in Table 1. All components are expressed in parts by weight unless otherwise stated.

tion of polyoxyalkylene diimide diacid. For example comparison of Example E1, E3 and E4 with comparative Examples CE1, CE3 and CE4 respectively demonstrates the improved flexibility of the composition of the present invention.

Alternatively, unmodified compositions having about the same flexibility as the modified polyetherimide ester compositions of the present invention require about a 20% increase in the amount of polyoxyalkylene diimide diacid component. Because of the susceptability of the polyether component to thermal and oxidative degradation as well as attack by solvents, applicant's composition by virtue of lesser amounts of polyether will have enchanced thermal and oxidative stability as well as improved solvent resistance as compared to the unmodified compositions.

Obviously, other modifications and variations of the present invention are possible in light of the above teachings. It is therefore to be understood that changes may be made in the particular embodiments of the invention described which are within the full intended scope as defined by the appended claims.

I claim:
1. A polyetherimide ester composition comprising (A) the reaction product of
   (a) one or more low molecular weight diols,
   (b) one or more dicarboxylic acids, and
   (c) a combination of (i) one or more polyoxylalkylene diimide diacids and (ii) one or more dimer acids wherein the amount of dimer is from about 5 to about 40 percent by weight based on the combined weight of (i) and (ii) and (B) a stabilizer therefore.
2. The composition of claim 1 wherein the amount of dimer acid is from about 15 to about 30 percent by weight based on the combined weight of (i) and (ii).
3. The composition of claim 1 wherein the dimer acid is selected from the group consisting of dimerized, unsaturated fatty acids, the hydrogenated derivatives thereof and the acid functioning derivatives of either.
4. The composition of claim 3 wherein the dimer acid is hydrogenated.
5. The composition of claim 1 wherein the dimer acid is at least about 95% by weight hydrogenated dimer acid.
6. The composition of claim 1 wherein the diol component (a) is a $C_2$ to $C_{15}$ aliphatic or cycloaliphatic diol or a mixture thereof.
7. The composition of claim 6 wherein the diol component (a) is from about 60 to 100 mole % 1,4-butanediol.

TABLE 1

|  | E1 | CE1 | E2 | CE2 | E3 | CE3 | E4 | CE4 | CE5 | CE6 |
|---|---|---|---|---|---|---|---|---|---|---|
| 1,4-Butanediol | 30 | 32 | 32 | 36 | 31 | 32 | 32 | 33 | 30 | 30 |
| Dimethylterephthalate | 36 | 40 | 38 | 46 | 37 | 40 | 38 | 42 | 38 | 38 |
| Hystrene 3695 Dimer | 7 | — | 10.5 | — | 5 | — | 5 | — | — | — |
| Diimide Diacid A | — | — | — | — | 27 | 28 | 25 | 25 | 32 | — |
| Diimide Diacid B | 27 | 28 | 20 | 18 | — | — | — | — | — | 32 |
| Stabilizer[a] | — | 3 | — | 3 | — | 3 | 5 | 3 | 3 | 3 |
| Trimelletic Anhydride[b] | — | 3.2 | — | 3.2 | — | 7.2 | — | 7.3 | 7.4 | 3.3 |
| Properties |  |  |  |  |  |  |  |  |  |  |
| Melting Point, °C. | 191 | 194 | 193 | 208 | 201 | 210 | 201 | 214 | 203 | 190 |
| Flexural Modulus, psi × $10^3$ | 19.2 | 25 | — | 52 | 16.9 | 24 | 18 | 32 | 16 | 20 |
| Tensile Elongation | 619 | — | — | — | 334 | — | — | — | — | — |
| Shore D Hardness | 48 | — | — | — | 48 | — | — | — | — | — |

[a] phenol derived stabilizer, amt is % by wt. based on amount of diimide diacids.
[b] in mole % based on the number of moles of diimide diacid.

From the examples in Table 1 it is clear that the compositions of the present invention have improved flexibility at the same or about the same levels of incorpora- 8. The composition of claim 6 wherein the diol component (a) is from about 80 to 100 mole % 1,4-butanediol.

9. The composition of claim 6 wherein the diol is 1,4-butanediol.

10. The composition of claim 1 wherein the dicarboxylic acid component (b) is selected from the group consisting of $C_2$ to $C_{16}$ aliphatic and/or cycloaliphatic dicarboxylic acid or a $C_6$ to $C_{16}$ aromatic dicarboxylic acid or the ester equivalents thereof and mixtures thereof.

11. The composition of claim 10 wherein the dicarboxylic acid component (b) is from about 60 to 100 mole % dimethyl terephthalate.

12. The composition of claim 10 wherein the dicarboxylic acid component (b) is from about 80 to 100 mole % dimethyl terephthalate.

13. The composition of claim 10 wherein the dicarboxylic acid component (b) is dimethyl terephthalate.

14. The composition of claim 1 wherein the polyoxyalkylene diimide diacid component (i) is derived from one or more polyoxyalkylene diamines and one or more tricarboxylic acid compounds containing two vicinal carboxyl groups or an anhydride group and an additional carboxyl group, and is characterized by the following formula:

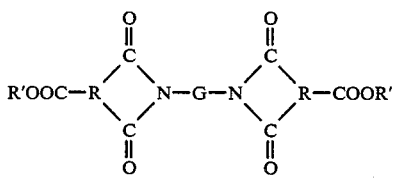

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the amino groups of a long chain alkylene ether diamine having an average molecular weight of from about 600 to 12000.

15. The composition of claim 14 wherein the polyoxyalkylene diimide diacid is such that each R is a $C_6$ trivalent aromatic hydrocarbon radical, each R' is hydrogen and G is the radical remaining after removal of the amine groups of a long chain alkylene ether diamine having an average molecular weight of the from about 900 to 4000.

16. The composition of claim 1 wherein the polyoxyalkylene diimide diacid is derived from trimellitic anhydride and a polyoxyalkylene diamine selected from the group consisting of polypropylene oxide diamine and a copoly(ethylene oxide-propylene oxide)diamine having predominately polyethylene oxide in the backbone.

17. The composition of claim 1 wherein the weight ratio of polyoxyalkylene diimide diacid (i) to dicarboxylic acid (b) is from about 0.25 to about 2.

18. The composition of claim 1 wherein the weight ratio of polyoxyalkylene diimide diacid (i) to dicarboxylic acid (b) is from about 0.4 to about 1.4.

19. The composition of claim 1 wherein up to a minor amount of a tricarboxylic component selected from the group consisting of carboxylic acid anhydrides having an additional carboxyl group and tricarboxylic acid compounds having two vicinal carboxyl groups.

20. The composition of claim 9 wherein the tricarboxylic component is characterized by the following formula:

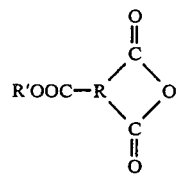

where R is selected from the group consisting of $C_2$ to $C_{20}$ alphatic and cycloaliphatic trivalent organic radicals and $C_6$ to $C_{20}$ aromatic trivalent organic radicals and R' is selected from the group consisting of hydrogen, $C_1$ to $C_6$ aliphatic and cycloaliphatic monovalent organic radicals and $C_6$ to $C_{10}$ aromatic monovalent organic radicals.

21. The composition of claim 9 wherein the tricarboxylic component is trimellitic anhydride.

22. The composition of claim 9 wherein the tricarboxylic component is present in an amount up to 20 mole percent based on the moles of polyoxyalkylene diimide diacid.

23. The composition of claim 9 wherein the tricarboxylic compound is present in an amount up to 10 mole percent based on the moles of polyoxyalkylene diimide diacid.

24. The composition of claim 1 wherein the stabilizer is 3,5-di-tert-butyl-4-hydroxy hydrocinnamic triester with 1,3,5-tris-(2-hydroxy ethyl)-3-triazine-2,4,6-(1H,3H,5H)trione.

25. The composition of claim 19 wherein the stabilizer is 3,5-di-tert-butyl-4-hydroxy hydrocinnamic triester with 1,3,5-tris-(2-hydroxy ethyl)-3-triazine-2,4,6-(1H,3H,5H)trione.

26. A polyetherimide ester composition comprising (A) the reaction product of (a) 1,4-butanediol (b) dimethylterephthalate and (c) a combination of (i) a polyoxyalkylene diimide diacid derived from trimellitic anhydride and a polyoxyalkylene diamine having the formula:

$$H_2N-G-NH_2$$

wherein G is the divalvent radical remaining after removal of the amino groups of a long chain alkylene ether diamine having a molecular weight of from about 600 to about 12000 and (ii) a dimer acid wherein the amount of dimer is from about 5 to about 40 percent by weight based on the combined weight of (i) and (ii) and (B) a stabilizer therefore.

27. The composition of claim 26 wherein the dimer acid is present in an amount of from about 15 to about 30 percent by weight based on the combined weight of (i) and (ii).

28. The composition of claim 26 wherein the dimer is the hydrogenated derivative of a dimerized unsaturated fatty acid.

29. The composition of claim 26 wherein the long chain alkylene ether diamine has a molecular weight of from about 900 to about 4000.

30. The composition of claim 27 wherein the long chain alkylene ether diamine is selected from the group consisting of polypropylene ether diamine and co(- polyethylene ether—propylene ether) diamine having a predominately polyethylene ether backbone.

31. The composition of claim 26 in which trimellitic anhydride is added as an additional reactant.

32. The composition of claim 26 wherein the stabilizer is 3,5-di-tert-butyl-4-hydroxy hydrocinnamic triester with 1,3,5-tris-(2-hydroxy-ethyl)-3-triazine-2,4,6-(1H,3H,5H)trione.

* * * * *